(12) United States Patent
Lin et al.

(10) Patent No.: US 9,925,688 B2
(45) Date of Patent: Mar. 27, 2018

(54) FOLDABLE MITER SAW HAVING A SAFETY DEVICE

(71) Applicant: Rexon Industrial Corp., Ltd., Taichung (TW)

(72) Inventors: Ju Zhen Lin, Taichung (TW); Ya Pin Kuo, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 43 days.

(21) Appl. No.: 14/872,548

(22) Filed: Oct. 1, 2015

(65) Prior Publication Data

US 2016/0221210 A1   Aug. 4, 2016

(30) Foreign Application Priority Data

Feb. 3, 2015  (TW) .............................. 104103557 A

(51) Int. Cl.
| | |
|---|---|
| *B27G 19/02* | (2006.01) |
| *B23D 45/14* | (2006.01) |
| *B27B 5/29* | (2006.01) |
| *B23D 45/04* | (2006.01) |

(52) U.S. Cl.
CPC ........... *B27G 19/02* (2013.01); *B23D 45/044* (2013.01); *B23D 45/14* (2013.01); *B27B 5/29* (2013.01)

(58) Field of Classification Search
CPC ........ B27G 19/00; B27G 19/02; B27G 19/04; B23D 45/14; B23D 45/04–45/048; Y10T 83/7788; Y10T 83/7705; Y10T 83/7697; Y10S 83/01

USPC ........ 192/116.5–150; 340/689, 686.2, 686.3, 340/825.23, 680, 690; 307/116, 119, 122, 307/326, 328

See application file for complete search history.

(56) References Cited

U.S. PATENT DOCUMENTS

| | | | | |
|---|---|---|---|---|
| 3,991,637 | A * | 11/1976 | Boge ...................... | B23D 47/04 83/490 |
| 5,184,534 | A * | 2/1993 | Lee ......................... | B23Q 11/00 30/391 |
| 5,261,162 | A * | 11/1993 | Siegler ................... | A01G 3/053 30/216 |
| 5,957,021 | A * | 9/1999 | Meredith ............. | B23D 45/048 83/397 |
| 9,016,179 | B2 | 4/2015 | Chiu | |
| 2010/0037743 | A1* | 2/2010 | Marocco .............. | B23D 45/003 83/454 |
| 2014/0047961 | A1* | 2/2014 | Schwaiger ............ | B23D 55/10 83/13 |

(Continued)

FOREIGN PATENT DOCUMENTS

| | | |
|---|---|---|
| TW | 201325776 | 7/2013 |
| TW | 201420239 | 6/2014 |

*Primary Examiner* — Stephen Choi
*Assistant Examiner* — Evan MacFarlane
(74) *Attorney, Agent, or Firm* — Bacon & Thomas, PLLC

(57) ABSTRACT

A foldable miter saw includes a base unit, a worktable, a cutting unit, and a safety device. The cutting unit can be set between a working position where the saw blade and the worktable define therebetween a contained angle within 90°~45° angle and a folded position where a stoppage signal is provided to power off the driver. The arrangement of the safety device enables a power supply to be cut off from the driver automatically when the cutting unit is moved to the folded position.

4 Claims, 8 Drawing Sheets

(56) References Cited

U.S. PATENT DOCUMENTS

2014/0251106 A1* 9/2014 Gehret ............... B23D 45/044
83/471.3
2016/0279822 A1* 9/2016 Ceroll ................ B23D 45/044

* cited by examiner

FOLDABLE MITER SAW HAVING A SAFETY DEVICE

BACKGROUND OF THE INVENTION

1. Field of the Invention

The present invention relates to processing machinery, and more particularly, to a foldable miter saw having a safety device.

2. Description of the Related Art

A conventional miter saw (Taiwan Patent 201325776) is known comprising a base unit, a worktable rotatable relative to the base unit, a cutting unit connected to the worktable at one lateral side, and a positioning unit. The base unit comprises a bottom frame, and two foot stands respectively fixedly mounted at two opposite lateral sides of the bottom frame. The positioning unit comprises a screw rod threaded into the worktable. When adjusting the cutting angle of the cutting unit, the operator must loosen the screw rod, and then operate the worktable to rotate the cutting unit relative to the base unit. After moving the cutting unit to the desired angle, the screw rod is again fastened tight.

Further, in Taiwan Patent 201420239, matching between a sector plate-shaped locking member and a positioning unit allows adjustment of the tilting angle of a saw blade of a cutting unit relative to a top wall of a worktable to achieve the desired cutting angle. The maximum tilting angle of the saw blade relative to the top wall of the worktable is a 45° angle.

The aforesaid prior art miter saws allow adjustment of the cutting angle, however, when these prior art miter saws are temporarily not in use and need to be stored, they require a large storage space because of their large size. Further, when packaging the miter saws for delivery after fabrication, they require much delivery space, which increases the delivery cost.

Further, when the aforesaid prior art miter saws are not used and need to be stored, the operator may accidentally trigger the motor drive to rotate the saw blade, thus resulting in accidental harm.

SUMMARY OF THE INVENTION

The present invention has been accomplished under the circumstances in view. It is the main object of the present invention to provide a foldable miter saw having a safety device, which automatically cuts off power supply when it is folded into a folded position, thus achieving a high level of operational safety.

To achieve this and other objects of the present invention, a foldable miter saw having a safety device comprises a base unit, a worktable, a cutting unit, and a safety device. The base unit comprises a front edge, a rear edge opposite to the front edge, a bottom wall extended from the front edge to the rear edge, and a top wall opposite to the bottom wall. The worktable is rotatably mounted at the base unit, comprising a work surface disposed opposite to the bottom wall and corresponding to the top wall and an axle holder facing toward the rear edge and connected to the work surface. The axle holder comprises an axis disposed in parallel to the work surface and extending from the rear edge toward the front edge. The cutting unit comprises a rotating member axially mounted at the axle holder of the worktable and rotatable relative to the base unit and the worktable, a support arm pivotally connected to the axle holder, a saw blade mounted at the support arm, and a driver mounted at the support arm and adapted for driving the saw blade to rotate. The cutting unit is movable between a working position and a folded position. Wherein, in the working position, a contained angle within 90°~45° is formed between the saw blade and the work surface of the worktable; in the folded position, the saw blade has an end edge thereof disposed in proximity to the work surface and facing toward the work surface. The safety device faces toward the rear edge of the base unit, and is adapted for cutting power supply from the driver when the cutting unit is set in the folded position.

Accordingly, the effectiveness of the present invention provides various advantages. Subject to the arrangement of the safety device, the power supply is automatically cut off when the cutting unit is moved to the folded position, thus achieving a high level of operational safety. Therefore, the present invention has the characteristics of simple structure, ease of operation and high level of operational safety.

Other advantages and features of the present invention will be fully understood by reference to the following specification in conjunction with the accompanying drawings, in which like reference signs denote like components of structure.

Figure 1:
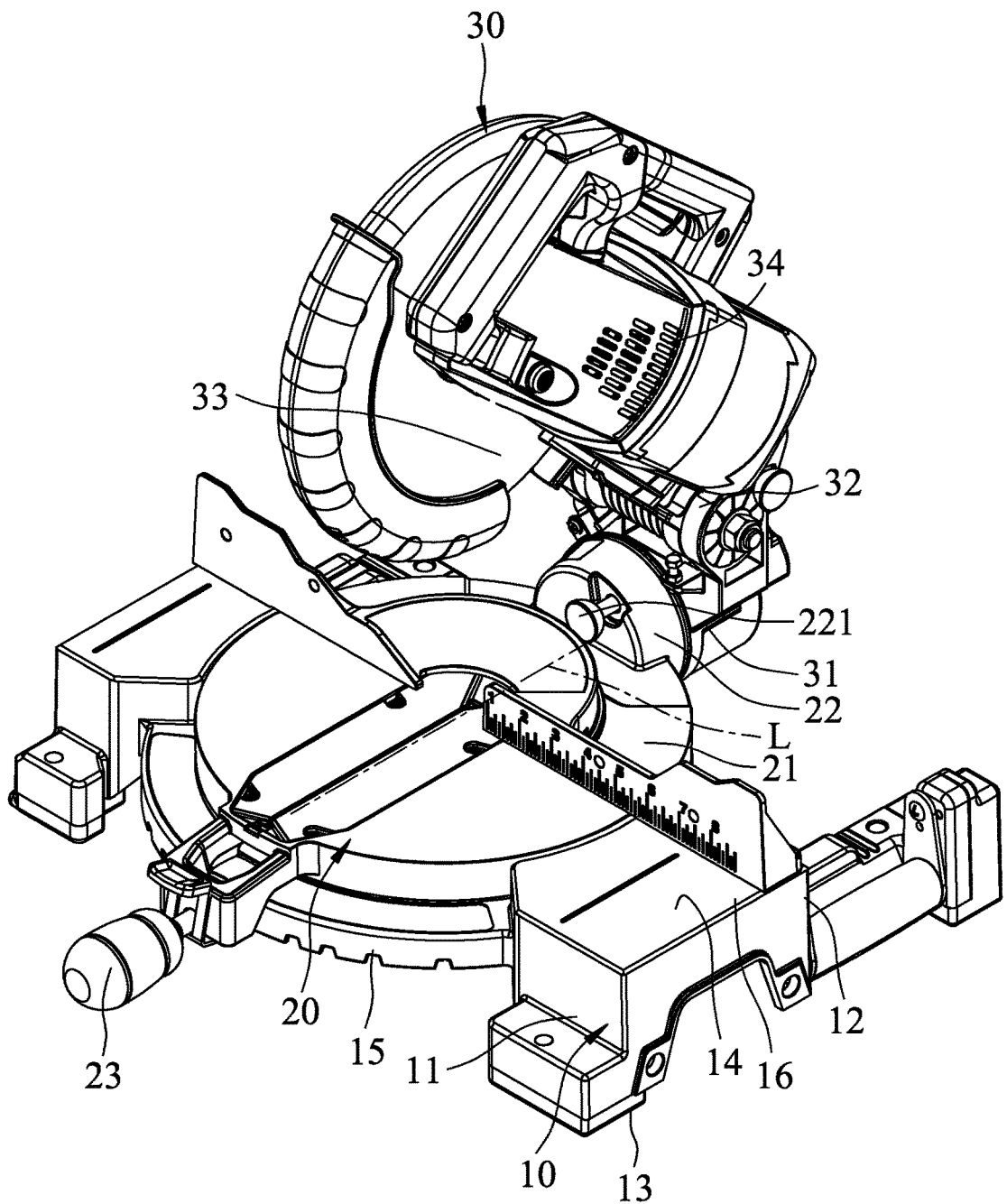
FIG. 1 is a top perspective view of a foldable miter saw in a working position in accordance with the present invention.
Figure 2:
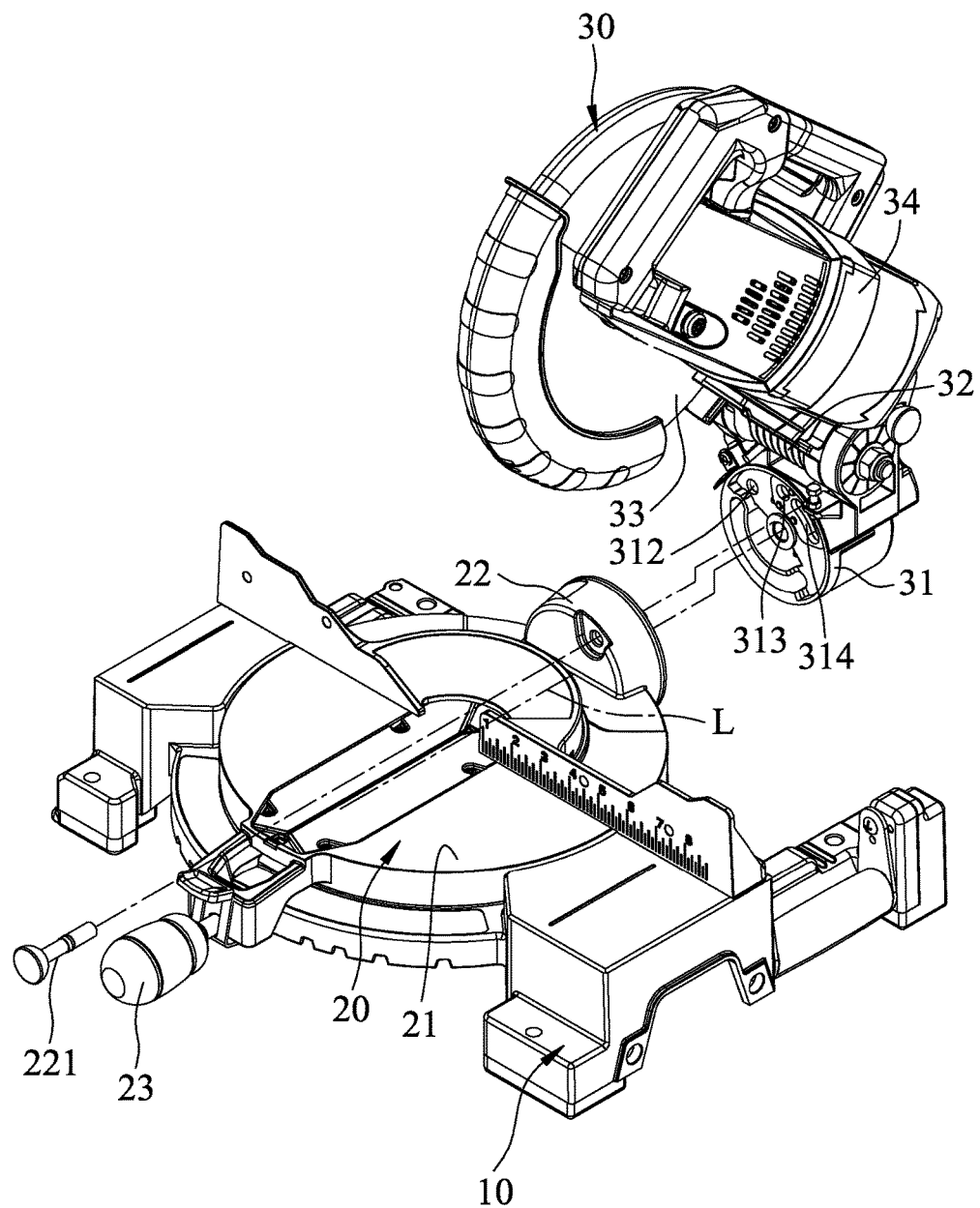
FIG. 2 is an exploded view of the foldable miter saw in accordance with the present invention.
Figure 3:
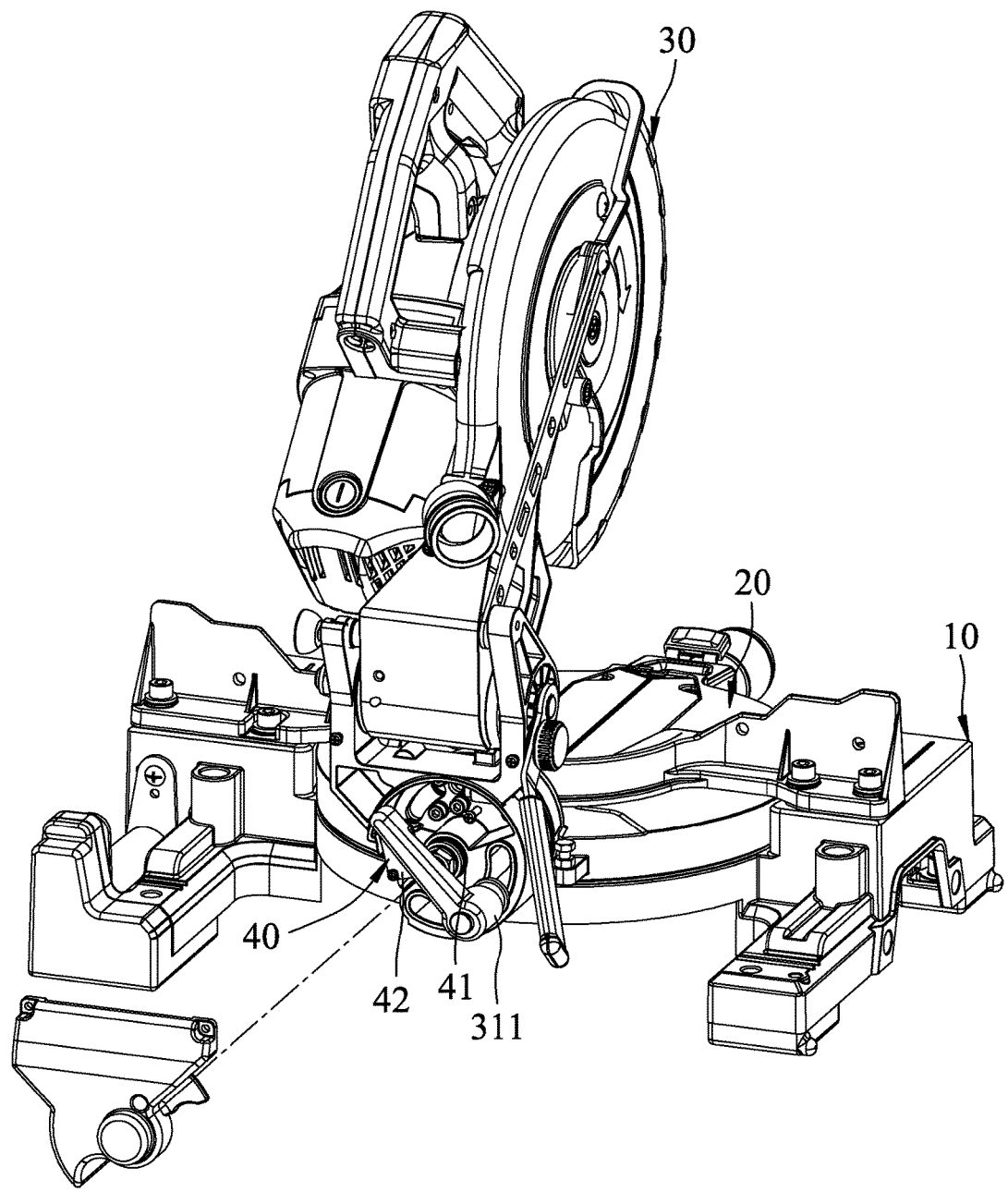
FIG. 3 is a rear perspective view of the present invention, illustrating the foldable miter saw in a working position.
Figure 4:
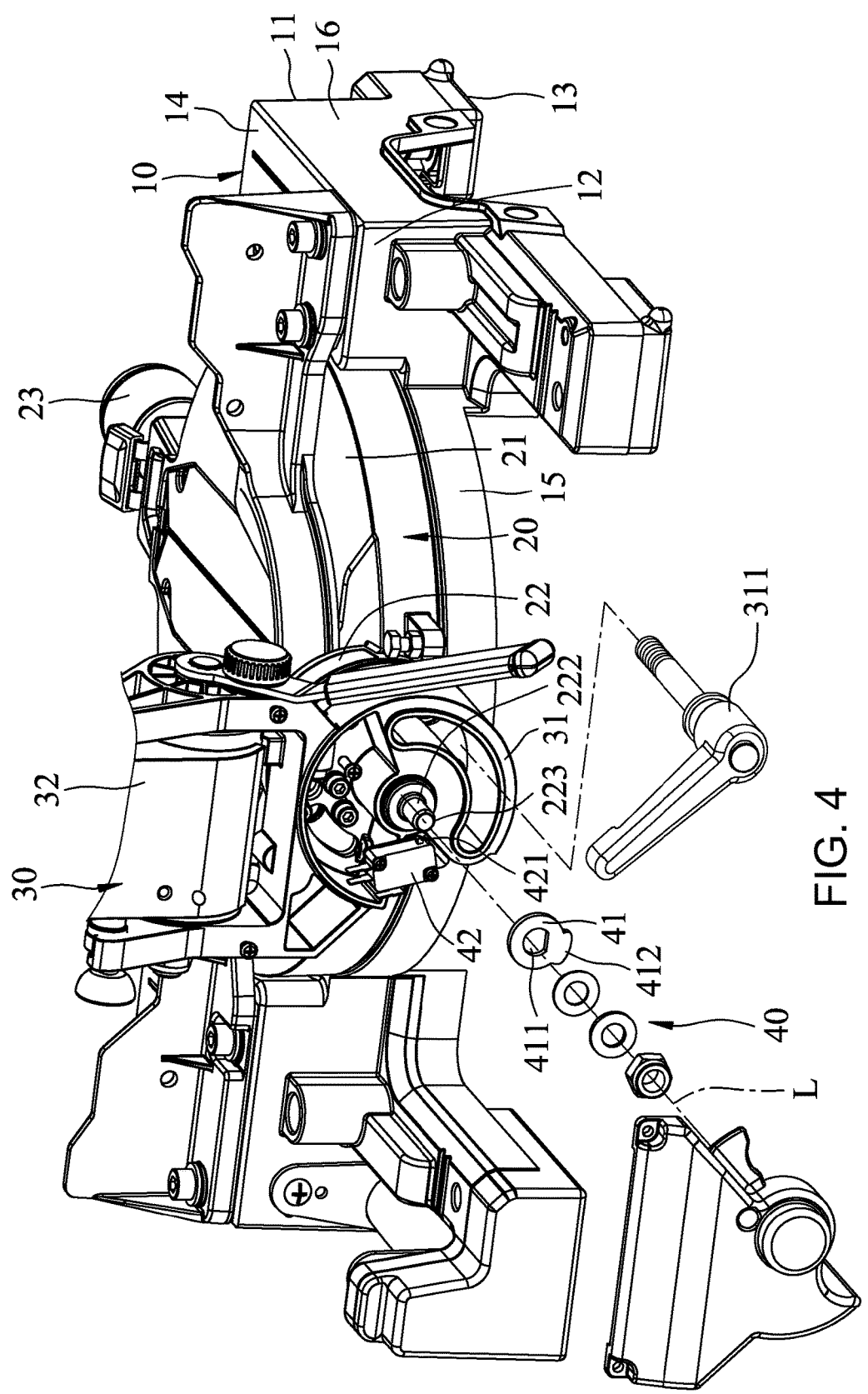
FIG. 4 is a rear side view, partially exploded, of the foldable miter saw in accordance with the present invention.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate an exemplary embodiment of the present invention and the components thereof, and in no way limits the structures, configurations and components thereof according to the present disclosure.

DETAILED DESCRIPTION OF THE INVENTION

Referring to FIGS. 1, 2, 3 and 4, a foldable miter saw having a safety device in accordance with the present invention is shown. The foldable miter saw comprises a base unit 10, a worktable 20, a cutting unit 30, and a safety device 40.

The base unit 10 comprises a front edge 11, a rear edge 12 disposed opposite to the front edge 11, a bottom wall 13 extended from the front edge 11 to the rear edge 12, and a top wall 14 disposed opposite to the bottom wall 13.

Structurally, the base unit 10 comprises a disk-like bottom frame 15, and two foot stands 16 radially connected to two opposite lateral sides of the bottom frame 15. The front edge 11 and the rear edge 12 each are respectively formed along a periphery of the disk-like bottom frame 15 and the foot stands 16. The top wall 14 is formed on the foot stands 16 at a top side.

The worktable 20 is rotatably mounted on a top wall of the bottom frame 15 of the base unit 10 between the two foot stands 16, The worktable 20 has a work surface 21 formed thereon and corresponding to the top wall 14 and opposite to the bottom wall 13, an axle holder 22 connected to the work surface 21 corresponding to the rear edge 12, and an operating handle 23 arranged opposite to the axle holder 22 and extended outwardly relative to the work surface 21. The axle holder 22 comprises an axis L extending from the rear edge 12 toward the front edge 11 in a parallel manner relative to the work surface 21, an operable locking pin 221, and a shaft 222 extending along the axis L. Further, the shaft 222 comprises a mounting portion 223 located at a rear end thereof corresponding to the rear edge 12. The mounting portion 223 has a non-circular cross section disposed perpendicular to the axis L.

The cutting unit 30 comprises a rotating member 31 axially connected to the axle holder 22 and rotatable relative to the base unit 10 and the worktable 20, a support arm 32 pivotally connected to the rotating member 31, a saw blade 33 mounted at the support arm 32, and a driver 34 mounted at the support arm 32 and adapted for driving the saw blade 33 to rotate. The rotating member 31 is axially mounted on the shaft 222 and rotatable to turn the support arm 32 about the axis L relative to the base unit 10 and the worktable 20, and equipped with a locking member 311 that extends in parallel to the axis L for locking the rotating member 31 to the axle holder 22. The rotating member 31 has a plurality of locating holes 312,313,314 defined therein. The locating holes 312,313,314 are spaced from one another at predetermined angles. The locating hole, referenced by 314, is elongated arc-shaped.

The safety device 40 orients toward the rear edge 12 of the base unit 10. The safety devices comprises a pressing member 41 positionable relative to the worktable 20 or the base unit 10, and a sensor 42 connected to the rotating member 31 of the cutting unit 30. In this embodiment, the pressing member 41 is a plate member fixedly mounted at the shaft 22. The pressing member 41 has a non-circular positioning hole 411 defined therein for fastening the pressing member 41 to the mounting portion 223 and a plate-like contact portion 412 protruded from the peripheral edge of the pressing member 41. The sensor 42 can be a micro switch, a limit switch, a toggle switch, or a rocker switch. The sensor 42 comprises a sensing portion 421 adapted for receiving and sensing the pressure from the contact portion 412.

Figure 5:
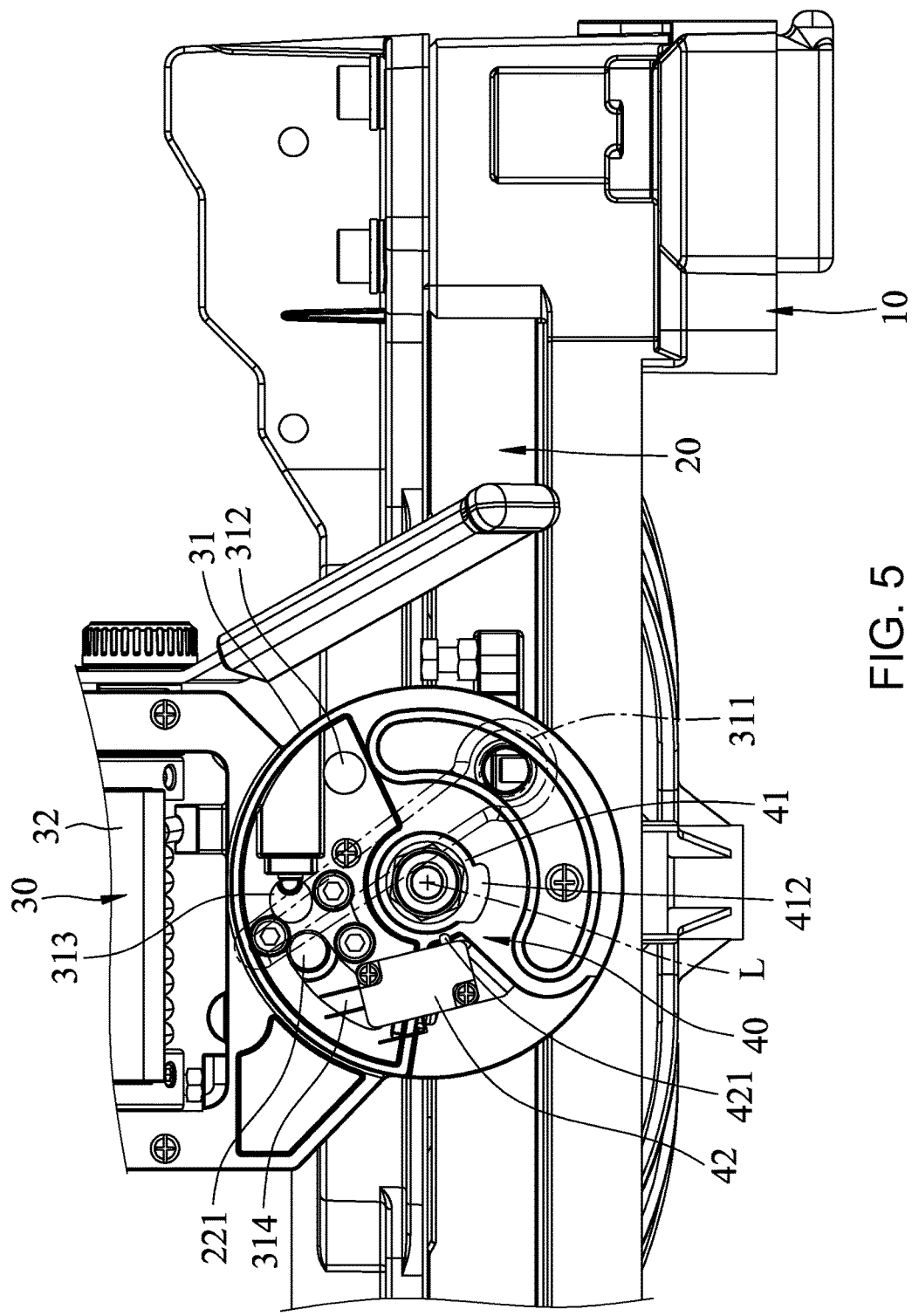
FIG. 5 is a schematic rear view of the present invention, illustrating the sensor located away from the pressing member.

Referring to FIGS. 1-4 again, the miter saw is shown in a working position. In the working position, the driver 34 is suspended above the work surface 21 of the worktable 20. When the workpiece to be cut is placed on the work surface 21, a vertical cutting operation is performed by operating the support arm 32 to move the saw blade 33 up and down relative to the rotating member 31. As illustrated in FIG. 5, when the cutting unit 30 is in the working position, the sensor 42 is located away from the pressing member 41, and the driver 34 is normally electrically conducted.

Figure 6:
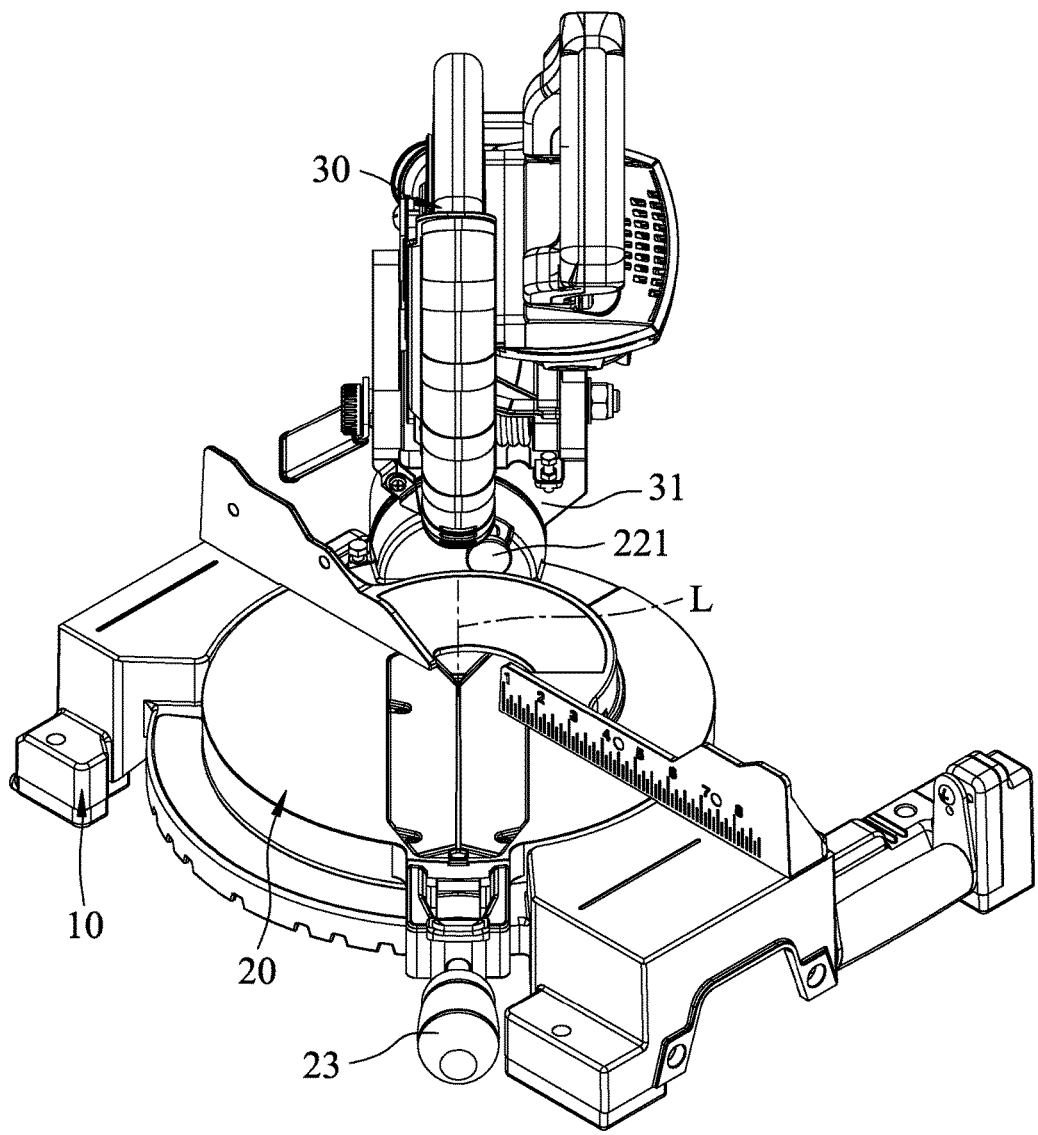
FIG. 6 is a perspective operational view of the present invention, illustrating the cutting unit moved with the worktable through 45° angle relative to the base unit.

Referring to FIG. 6, when the operator biases the operating handle 23 to turn the worktable 20 and the cutting unit 30 relative to the base unit 10 for performing a miter cut. When the operator operates the locking member 311 and the operable locking pin 221 for allowing rotation of the rotating member 31 about the axis L relative to the worktable 20. As shown in FIGS. 1-6, the cutting unit 30 is turnable about the axis L leftwards or rightwards, and the operable locking pin 221 is engaged in the middle locating hole 313 or left elongated arc-shaped locating hole 314 such that a predetermined contained angle (normally not less than 40°) is formed between a peripheral edge of the saw blade 33 and the work surface 21. Further, the driver 34 is suspended above the work surface 21 of the worktable 20 for performing a bevel cut.

Figure 7:
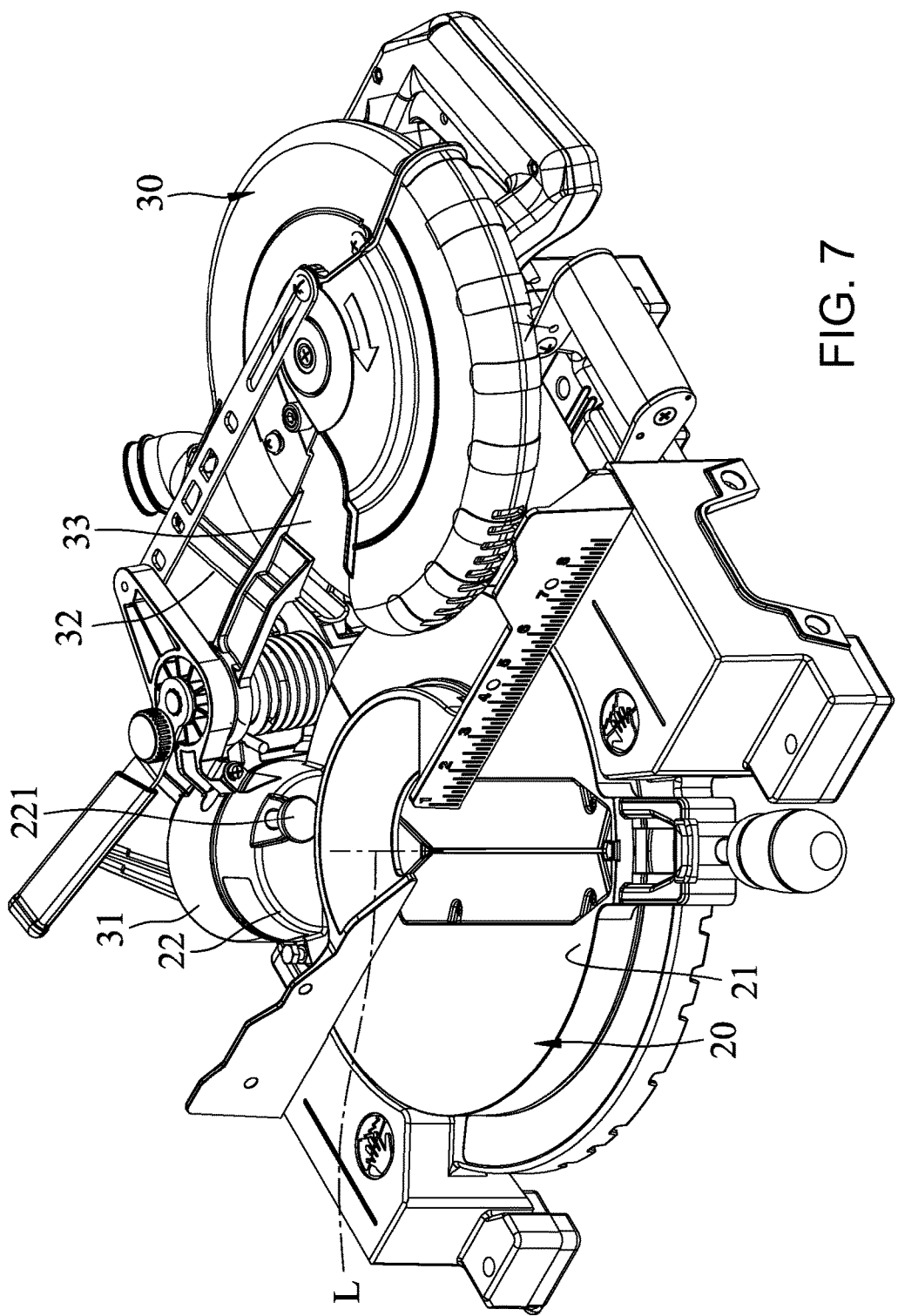
FIG. 7 is a perspective view of the present invention, illustrating the foldable miter saw in the folded position.
Figure 8:
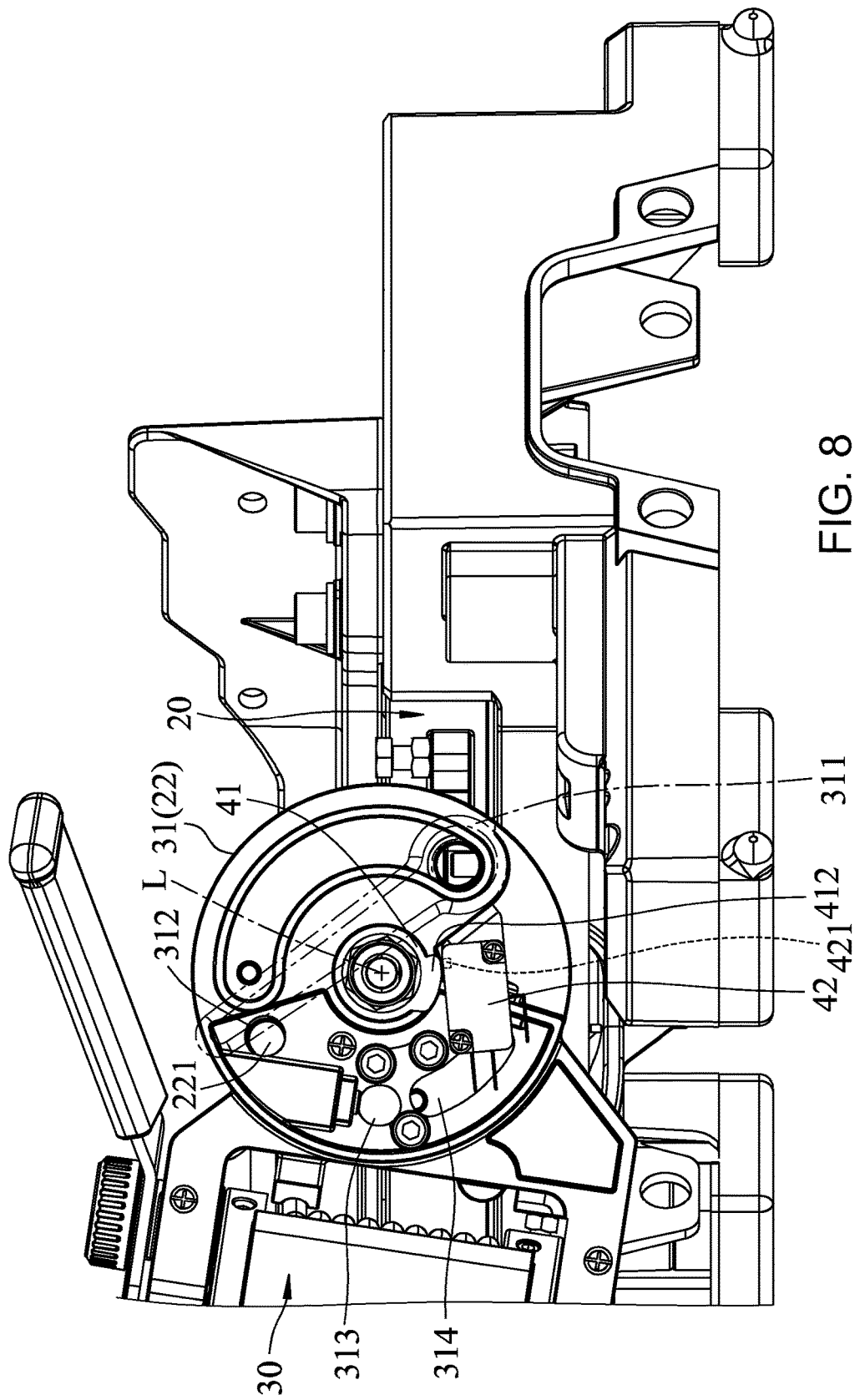
FIG. 8 is a schematic rear view of the present invention, illustrating the cutting unit folded relative to the base unit and the sensor triggered by the pressing member.

If the miter saw is not to be used and needs to be stored or packed for delivery, the operator can rotate the worktable 20 to turn the cutting unit 30 45° counterclockwise relative to the base unit 10 as shown in FIG. 6. Thereafter, as shown in FIG. 7 and FIG. 8, the operator can operate the locking member 311 and the operable locking pin 221, and then disengage the operable locking pin 221 from the locating hole 313 or 314. The rotating member 31 is then rotated relative to the axle holder 22 for turning the cutting unit 30 clockwise about the axis L relative to the worktable 20 to the position where the peripheral edge of the saw blade 33 is disposed in proximity to the work surface 21 in a parallel manner. At this time, the cutting unit 30 is in a folded position, and the operable locking pin 221 can then be engaged into the locating hole 312 to lock the cutting unit 30 in this folded position where the driver 34 is disposed in proximity to the bottom wall 13 at a rear side relative to the worktable 20 to face toward the rear edge 12. The rotating member 31 and the support arm 32 are also disposed at a rear side relative to the worktable 20 in this folded position.

Referring to FIG. 8, when the cutting unit 30 is converted to the folded position, the rotating member 31 of the cutting unit 30 will carry the sensing portion 421 of the sensor 42 into contact with the contact portion 412 of the pressing member 41, thereby cutting off power supply from the driver 34. Thus, when the cutting unit 30 is converted from the working position to the folded position, the rotating member 31 of the cutting unit 30 drives the sensor 42 toward engagement with the pressing member 41 to cut off power supply from the driver 34 in order to avoid accidentally actuating the miter saw and thus enhance operational safety. When the cutting unit 30 is converted back to the working position, the rotating member 31 drives the sensor 42 to disengage from contact with the pressing member 41, such that the power supply of the driver 34 is restored.

It should also be appreciated that in the above-described embodiment, a contact type safety device is used. However, in actual application, a non-contact type safety device (such as an optical sensor) may be used as a substitute. Further, the mounting position of the safety device is not limited to the aforesaid design of mounting the safety device at the shaft 222 at a rear side relative to the rotating member 31. Alternatively, the safety device can be mounted at any other location at the cutting unit 30 or the base unit 10, achieving the same level of safety.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A foldable miter saw, comprising:

a base unit comprising a front edge, a rear edge opposite to said front edge, a bottom wall extended from said front edge to said rear edge, and a top wall opposite to said bottom wall;

a worktable rotatably mounted at said base unit, said worktable comprising a work surface disposed opposite to said bottom wall and corresponding to said top wall and an axle holder facing toward said rear edge and connected to said work surface, said axle holder comprising an axis extending in a direction from said rear edge toward said front edge disposed in parallel to said work surface;

a cutting unit comprising a rotating member axially mounted at said axle holder of said worktable and rotatable relative to said base unit and said worktable, a support arm pivotally connected to said axle holder, a saw blade mounted at said support arm, and a driver mounted at said support arm and adapted for driving said saw blade to rotate, wherein said cutting unit is convertible between a working position and a folded position such that in the working position, a contained angle within 90° to 45° is formed between the saw blade and said work surface, and in the folded position, a peripheral edge of said saw blade is disposed in proximity to said work surface and facing toward said work surface; and a safety device connected to said rear edge of said base unit and adapted for cutting off a power supply from said driver when said cutting unit is set in said folded position, wherein said safety device comprises a pressing member fixed relative to one of said worktable or said base unit, and a sensor connected to said rotating member of said cutting unit and wherein said sensor is located away from said pressing member when said cutting unit is in said working position, said sensor is moved into contact with said pressing member and triggered by said pressing member to cut off the power supply of said driver when said cutting unit is moved to said folded position, and wherein the pressing member comprises a contact portion protruded from a peripheral edge of the pressing member, and the sensor is rotated away from the contact portion in the working position and rotated toward the contact portion in the folded position to contact said contact portion.

2. The foldable miter saw as claimed in claim 1, wherein said sensor is one of a micro switch, a limit switch, or a toggle switch.

3. The foldable miter saw as claimed in claim 1, wherein the rotating member has a plurality of locating holes spaced from one another at predetermined angles for locking the cutting unit at predetermined contained angles.

4. The foldable miter saw as claimed in claim 1, wherein said axle holder of said worktable further comprises a shaft extending along said axis adapted for accommodating said rotating member of said cutting unit; said pressing member comprises a non-circular positioning hole configured to be mounted to said shaft; said sensor comprising a sensing portion facing toward said contact portion and pressable by said contact portion.

* * * * *